Feb. 9, 1971 J. C. SWEETON ET AL 3,561,222
APPARATUS FOR LAYING UNDERGROUND CABLE, WIRE, PIPE, OR THE LIKE
Filed Jan. 30, 1969 2 Sheets-Sheet 1
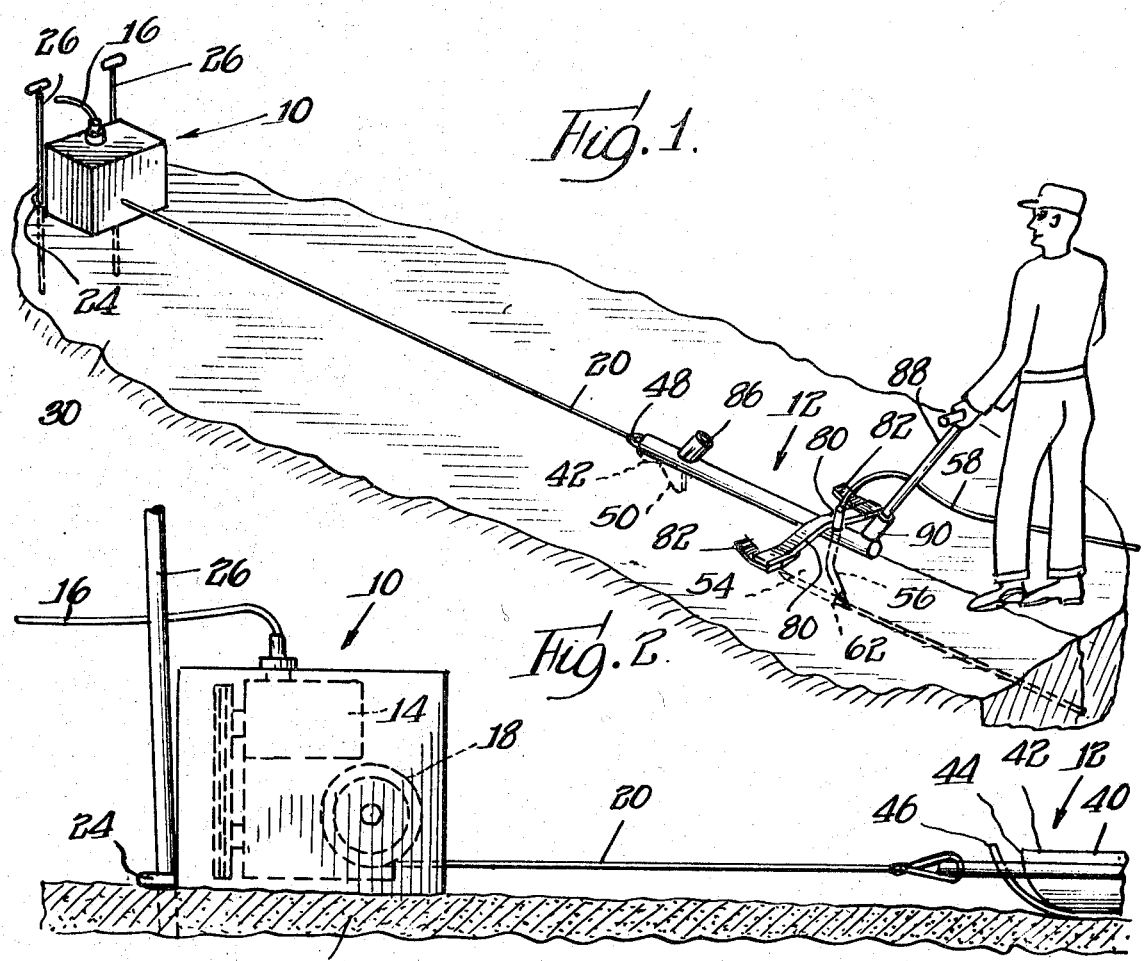
Inventors
James C. Sweeton
Frank G. Cain
By: Wallenstein, Spangenberg, Hattis, & Strampel attys

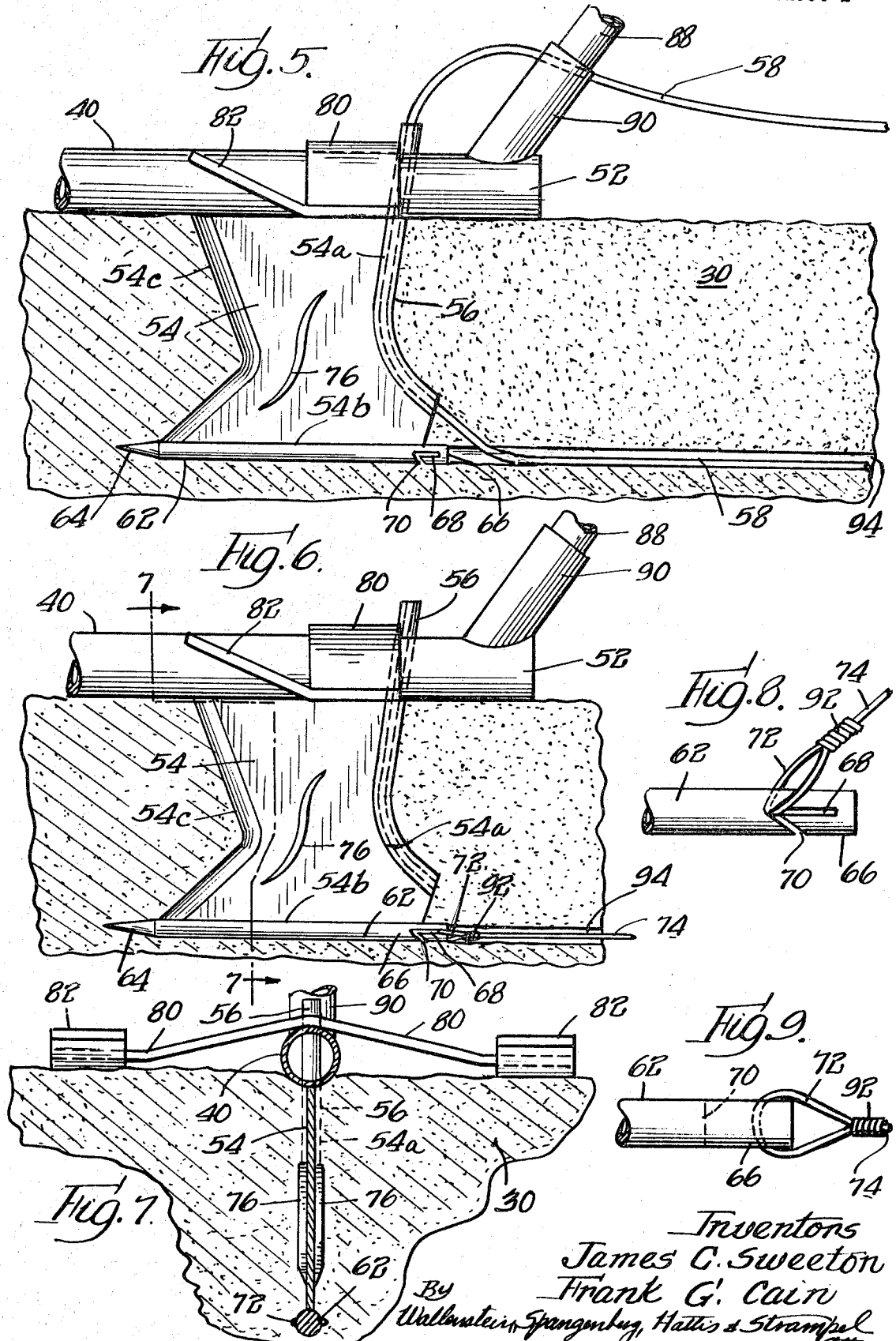

United States Patent Office 3,561,222
Patented Feb. 9, 1971

3,561,222
APPARATUS FOR LAYING UNDERGROUND CABLE, WIRE, PIPE, OR THE LIKE
James C. Sweeton, 618 Myrtlewood Lane, Wheaton, Ill. 60187, and Frank G. Cain, 3662 Ingleside, Dallas, Tex. 75229
Filed Jan. 30, 1969, Ser. No. 795,319
Int. Cl. F16l *1/00;* E02f *5/00*
U.S. Cl. 61—72.6
6 Claims

ABSTRACT OF THE DISCLOSURE

Easily hand portable apparatus for laying underground cable, wire, pipe, or the like, which includes a hand controllable ground slitting or plowing unit adapted to be connected by a cable to a power driven winch and pulled along the ground thereby, said unit comprising an elongated body portion having power driven cable engaging means positioned at the forward end thereof and a plow blade positioned at the rear or trailing end thereof. A stationary ground penetrating pre-cutting blade or knife is secured to the body portion of the plowing unit rearwardly of the forward end thereof. Means is secured to the plow blade for laying, or pulling, cable, wire, pipe, or the like, into the narrow slit formed by the blade. Means also is provided on the plow blade for intercepting and deflecting loosened soil whereby the blade is maintained at maximum depth in the soil, and the loosened soil is substantially prevented from exerting forces on other elements secured to the blade which would tend to lift the blade out of its normal path of travel through the soil. Laterally extending stabilizing arms, capable of supporting the full weight of an operator, are secured to the body portion adjacent the rear or trailing end thereof. A pair of removable handles are positioned on the upper surface of the body portion to provide leverage or support for an operator. The apparatus advantageously includes a portable winch which can be anchored at any preselected location and connected to the ground slitting or plowing unit by means of a retractable cable, or the like.

Apparatus for laying underground cable, wire, pipe, or the like, generally speaking, heretofore, has included a plow-carrying, wheeled trailer which is attached to, and pulled by, a large tractor, or a truck mounted winch, or small width trenchers. Such apparatus is characterized by its cumbersomeness, its lack of maneuverability, the need for multi-man crews to operate it, and its high cost. Apart from the foregoing shortcomings, the plow or trench forming blade utilized in connection with the apparatus is of a size such that extensive damage can be caused to sod and the roots of valuable plantings as it moves through the soil. In addition, the width of the slit formed by the plow or trench forming blade generally requires that the area traversed thereby be refilled or substantially restored. These factors, of course, add to the overall cost of an installation, and, coupled with the cumbersomeness and lack of maneuverability of the apparatus, make the apparatus unsatisfactory for use in installing underground branch telephone lines, gas pipelines, electric lines, or the like, leading to or from, for example, private residences.

In accordance with the present invention, apparatus for laying underground cable, wire, pipe, or the like, is provided which, due to its easy portability, its maneuverability, and the nature of its ground slitting action, makes it especially suitable for use in carrying out branch utility line underground installations leading to and from private residences, and the like. The size and weight of the apparatus is such that one man can readily move it to any desired location and complete an underground installation without assistance. The maneuverabiity of the apparatus permits an operator to circumvent obstructions and even to go around corners. The slit formed in the ground with the apparatus is narrow and essentially self-refilling, and thus enables an underground installation to be accomplished with little or no damage to a lawn, for example, and without the need for time consuming and cost-increasing post-installation refilling, leveling and re-seeding or re-sodding operations. The compactness of the apparatus, coupled with its light weight, enable it to be easily transported and stored. Furthermore, it can be manufactured at a fraction of the cost of conventional apparatus used for laying underground cable, wire, pipe, or the like. The apparatus has the further advantage of enabling cable, wire, pipe, or the like, both to be layed, or pulled, underground with a single unit.

Briefly, the apparatus of the present invention comprises a hand controllable ground slitting or plowing unit which is adapted to be connected by a cable, for example, to a portable power driven winch. The ground slitting or plowing unit has an elongated, main body portion, one end of which is connectable to said cable. A plow blade is secured adjacent to the other end of the body portion. A stationary pre-cutting blade or knife is secured to the body portion rearwardly of the forward or leading end thereof. Tubular guide means is provided on the trailing edge of the plow blade for directing cable, wire, pipe, or the like, into the narrow slit formed by the plow blade. Tunneling means advantageously is secured to lower or bottom edge of the plow blade for pulling cable, wire, pipe, or the like, underground through the slit formed by the plow blade. Each face of the plow blade has soil intercepting and deflecting means thereon which enables the loosened soil to exert a force on the blade tending to maintain the blade at a miximum depth in the soil, and, in addition, to substantially prevent the loosened soil from exerting an upward force on the tubular guide means which would tend to lift the rear of the blade out of its normal path of travel through the soil. Laterally extending stabilizing or side arms are joined to the body portion adjacent the rear or trailing end thereof. The stabilizing or side arms, at their extremities, are provided with ground surface engaging means in the form of slides or skids which serve, among other things, as leveling means for the body portion. The stabilizing or side arms are adapted to support the full body weight of an operator whereby the plow blade can be maintained at maximum depth in the ground in those instances where soil conditions require such added weight. Extending rearwardly and upwardly from the body portion, at the rear or trailing end thereof, is a removable handle, adapted to be grasped by one hand of an operator, for guiding the body portion and maintaining the plow blade at least partly below ground level as the body portion is pulled along the ground by the winch. A second removable handle advantageously is positioned on the body portions adjacent the forward or leading end thereof. The second handle is adapted to be grasped by an operator in those instances where he is standing on the stabilizing or side arms to achieve maximum penetration of the plow blade in the ground. The winch utilized in connection with the apparatus, like the ground slitting or plowing unit, is compact, light in weight, and easily hand portable. It advantageously has means for enabling it to be securely anchored in the ground, and can be adapted to be connected to a conventional AC or DC electrical power source.

The foregoing, and other advantages and features of this invention will become more readily apparent from the following description taken in conjunction with the accompanying drawings wherein:

FIG. 1 is a view in perspective showing an embodiment of the apparatus of this invention in use;

FIG. 2 is a fragmentary side view in elevation illustrating components of the winch, and further showing the position of the forward or leading end of the ground slitting or plowing unit with relation to the ground as it is pulled toward the winch;

FIG. 3 is a fragmentary view in perspective of the ground slitting or plowing unit of said embodiment of the invention;

FIG. 4 is an end view of the forward or leading end of the ground slitting or plowing unit.

FIG. 5 is a fragmentary side view in elevation illustrating the various elements of the rear or trailing end of said ground slitting or plowing unit when the unit is used to lay cable, wire, pipe, or the like, underground;

FIG. 6 is a view corresponding to the view of FIG. 5 wherein said unit is shown pulling cable, wire, pipe, or the like, underground;

FIG. 7 is a vertical sectional view taken substantially along line 7—7 of FIG. 6;

FIG. 8 is an enlarged fragmentary side view of the end of the tunneling means adapted to engage and pull cable, wire, pipe, or the like, underground with said unit; and FIG. 9 is an enlarged fragmentary top view of said end of the tunneling means.

Referring, now, in greater detail to the drawing, the apparatus as illustrated comprises a winch 10 and a ground slitting or plowing unit 12. While the winch 10 may take various forms, and may be hand crank operated or power driven, in accordance with the preferred practice of the invention, the winch 10 desirably is a commercially available AC or DC powered unit, the frame of which has been modified to enable it to be securely staked, or otherwise, anchored in the ground. Exemplary of a winch having utility for the purposes of the present invention is the one sold under the trademark "MY-TE" (City Engineering Co. Inc.). As shown, the winch 10 comprises a motor 12 which is adapted to be connected to a suitable AC or DC source by a line or cable 16. The main shaft of the motor 14 is operatively engaged with a cable drum 18 upon which is wound a steel cable 20. The winch 10 is mounted on a frame 22 which is provided with rearwardly extending ears 24—24 having openings therethrough for receiving a pair of steel stakes or pins 26—26 for anchoring the winch securely to the surface of the ground 30.

The ground slitting or plowing unit 12 of the embodiment of the invention illustrated comprises an elongated, substantially cylindrically shaped main body portion 40 which may be fabricated of steel bar stock. Except for its forward or leading end 42, the body portion 40 is of substantially the same cross-sectional area throughout its length. The leading end 42 advantageously is of larger cross-sectional area to provide added weight at that end of the body portion 40, and has an inwardly and downwardly curved surface 44 to which is joined a metal plate member or slide 46. The plate member 46 is adapted to ride on the surface of the ground 30 as the unit 12 is pulled along by the winch 10, and the free or leading end thereof is curved upwardly and outwardly to prevent the leading end 42 of the body portion 40 from burrowing into the ground. A U-shaped, winch cable-engaging member 48 is secured to the leading end 42 of the body portion 40.

Rearwardly of the leading end 42 and adjacent the plate member 46, a ground penetrating, pre-cutting blade or knife 50 is secured to the body portion 40. In accordance with the preferred embodiment of the apparatus, the pre-cutting blade or knife 50 is in the shape of a quadrant of a circle and is mounted on the body portion 40 with the curved edge 50a thereof as the forward or leading edge.

Adjacent the rear or trailing end 52 of the body portion 40 there is secured a plow blade 54. The rear or trailing edge 54a of the blade 54 has a tubular guide member or conduit 56 secured to it for directing cable 58, for example, into the slit formed by the blade 54. The upper end of the conduit 56 passes through a transverse bore 60 in the body portion 40 and extends above the upper surface thereof. Secured to the bottom edge 54b of the plow blade 54 is a substantially cylindrically shaped metal tunneling rod 62, the leading end 64 of which is sharpened to a point to facilitate movement thereof through the ground. The trailing end 66 of the rod 62 is provided with a longitudinal slot 68 and an intersecting forwardly and upwardly extending transverse slot 70 for receiving the looped end 72 of a cable 74, for example, to be pulled underground by the ground slitting or plowing unit 12. Each face of the plow blade 54 has a curved, soil deflecting ridge 76 formed thereon adjacent the forward or cutting edge 54c thereof. The curvature of the ridges 76—76, as shown, corresponds substantially to the curvature of the rear or trailing edge 54a of the blade 54. The ridges 76—76 act both to cause loosened soil to exert a downward and rearward force thereagainst whereby the blade is maintained at a maximum depth in the soil and, concomitantly, to deflect loosened soil upwardly and away from the area of greatest curvature of the conduit 56 thereby substantially preventing the loosened soil from exerting an upwardly directed force on the conduit 56 which otherwise would be sufficient in magnitude to raise or lift the rear or trailing edge 54a of the plow blade 54 out of the ground as the blade 54 performs its ground slitting function.

Positioned above the plow blade 40, adjacent the rear or trailing end 52 of the body portion 40, are laterally extending stabilizing or side arms 80—80 to the outer extremities of which are secured forwardly and upwardly extending ground surface engaging slides or skids 82—82. The side arms 80—80, apart from their stabilizing and leveling action, are adapted to support the full weight of an operator. By standing on the side arms 80—80, as the unit 12 is pulled along the ground by the winch 10, an operator can, in those instances where soil conditions require it, exert a force on the plow blade 54 sufficient to maintain it at the proper depth in the ground. To enable an operator to properly balance himself on the unit 12 while thusly standing on the side arms 80—80, a removable handle 84, an end of which is engaged in a sleeve 86 secured on the body portion 40, is provided. A second removable handle or lever 88 is positioned at the rear or trailing end 52 of the body portion 40 for enabling an operator both to guide the unit 12 as it is pulled along by the winch 10 and to exert a downward force on the plow blade 54 during normal operation of the unit 12 sufficient to maintain the blade 54 at the proper depth in the ground. As shown, an end of the handle or lever 88 is received in an upwardly and rearwardly extending sleeve 90 secured on the upper surface of the body portion 40 at the rear or trailing end 52 thereof. The sleeve 90 advantageously is pitched rearwardly at approximately a 45° angle to the longitudinal axis of the body portion 40.

In utilizing the apparatus of the present invention, the winch 10 is first anchored securely to the ground as shown in FIG. 1. The location of the winch 10, of course, should, if possible, be at, or near, one of the terminal points of the projected installation. The ground slitting or plowing unit 12 is then positioned at, or near, the other terminal point of the installation, and an end of a cable, wire, pipe, or the like, exemplified by cable 58 in the drawing, to be layed underground, is passed through the tubular guide member or conduit 56 on the plow blade 54. The cable 58 desirably is wound on a drum, not shown, which is secured in position a short distance behind the unit 12. The free end of the cable 20 of the winch 10 is attached to the U-shaped member 48 positioned at the forward or leading end 42 of the unit 12. When the motor 14 of the winch 10 is energized, the operator, while grasping the handle or lever 88 initiates the ground slitting action of the plow blade 54 by placing one foot on one of the side arms 80—80 and exerting downward pressure sufficient to cause the blade 54 to penetrate the soil or ground. Thereafter, the operator can maintain the blade 54 below the surface of the ground by exerting rearward pressure on the handle or lever 88 with his hand. As the unit 12 is pulled along the ground by the cable 20 of the winch 10, the force exerted by the taut cable 20 on the forward or leading end 42 of the unit 12, coupled with the added weight of the end 42, acts to maintain the plate member or slide 46 in substantially constant contact with the ground surface, thereby to keep the precutting blade or knife 50 at least partly below the surface of the ground throughout the cable laying operation and thus enabling it effectively to perform its ground pre-cutting function. The pre-cutting action of the blade or knife 50 acts to reduce to a minimum any tearing of sod or roots by the blade 54 which might otherwise occur. As a result, the width of the slit formed by the blade 54 is small, and can be closed easily by the operator's feet as he walks along behind the unit 12. The slides or skids 82—82 remain in contact with the ground surface throughout the operation, and serve both a stabilizing and a leveling function. As the unit 12 approaches the winch 10, the motor 14 is de-energized, and the installation is completed after cutting the cable 58 and freeing it from the unit 12.

The apparatus, as indicated, also can be used to advantage to pull cable, wire, pipe, or the like, underground. The apparatus desirably is utilized for this purpose in those cases where the cable, etc. is of a size such that it would not freely pass through the conduit 56. In utilizing the apparatus for pulling the cable 74, for example, underground, the sequence of steps outlined above essentially are followed except that an end of the cable is formed into a loop 72, as shown in FIGS. 8 and 9, and the loop is engaged in the slot 68 formed in the end 66 of the tunneling rod 62. Any suitable clamping means such as locking clamp 92 can be employed in forming a loop at the end of the cable. The tunneling action of the rod 62 as the unit 12 is drawn along the ground by the winch 10 provides an underground channel 94 which facilitates pulling of the cable through the slit formed by the plow blade 54 and substantially eliminates stresses on the cable which might otherwise cause it to snap.

While for purposes of illustration, a preferred embodiment of the present invention has been disclosed, various modifications thereof may become apparent to those skilled in the art upon reference to the foregoing disclosure and, therefore, this invention should be limited only by the scope of the appended claims.

What is claimed is:

1. Portable apparatus for laying flexible cable, wire, pipe, or the like, underground, and being adapted to be connected to, and pulled along the ground by, a power driven line, comprising an elongated body portion having means at the leading end thereof connectable to a power driven line, downwardly extending ground penetrating pre-cutting means secured to the body portion forwardly of the mid-point and adjacent to said leading end thereof, a ground slitting blade secured to the body portion rearwardly of the mid-point and forwardly of the trailing end thereof, guide means secured to the trailing edge of the ground slitting blade for directing cable, pipe, or the like, into the slit formed in the ground by the ground slitting blade, stabilizing means secured to the body portion rearwardly of the mid-point and forwardly of the trailing end thereof, said stabilizing means including laterally extending arms having ground surface-engaging skids positioned at the extremities thereof, said arms of the stabilizing means being of a length and width to enable an operator of the apparatus to stand thereon while straddling the body portion of the apparatus, rearwardly and upwardly extending lever means removably secured to the body portion at the trailing end thereof rearwardly of the ground slitting blade, said lever means being adapted to be grasped by the hand of an operator as he walks behind the apparatus for guiding the body portion and maintaining the ground slitting blade at least partly below ground level as the apparatus is pulled along the ground, and handle receiving means positioned on the body portion forwardly of the mid-point thereof for releasably engaging a handle to be grasped by an operator as support when he is standing on the laterally extending arms of the stabilizing means as the apparatus is pulled along the ground.

2. Apparatus as claimed in claim 1 wherein the forward or leading end of the said body portion is weighted to better enable the said ground penetrating pre-cutting means to remain embedded in the ground.

3. Apparatus as claimed in claim 1 wherein tunneling means is provided on the ground slitting blade, said tunneling means being adapted to pull cable, wire, pipe, or the like, through soil as the body portion is pulled along the ground.

4. Apparatus as claimed in claim 3 wherein the tunneling means comprises a pointed metal rod having slots formed in the trailing end thereof for engaging a loop formed in cable, wire, pipe, or the like, to be pulled underground by the apparatus.

5. Apparatus as claimed in claim 1 wherein the ground slitting blade is provided with soil intercepting and deflecting means on the sides thereof whereby loosened soil is caused to exert a force thereagainst tending to maintain the blade at maximum depth in the soil.

6. Apparatus for laying flexible cable, wire, pipe, or the like, underground, comprising in combination a hand portable winch having a power driven retractable cable associated therewith, said winch being provided with means for enabling it to be securely anchored in a preselected location, and a hand portable ground slitting unit having means at one end thereof connectable to the cable of the winch, said unit comprising an elongated body portion having a leading end and a trailing end, stationary ground penetrating pre-cutting means secured to the body portion forwardly of the mid-point and adjacent to the leading end thereof, a plow blade secured to the body portion rearwardly of the mid-point and forwardly of the trailing end thereof, guide means secured to the trailing edge of the plow blade for directing cable, pipe, or the like, into the opening formed in the ground by the plow blade, leveling means secured to the body portion rearwardly of the mid-point and forwardly of the trailing end thereof, said leveling means including laterally extending arms having ground surface-engaging skids positioned at the extremities thereof, said arms of the leveling means being of a length and width to enable an operator of the apparatus to stand thereon while straddling the body portion of the apparatus, rearwardly and upwardly extending lever means removably secured to the body portion at the trailing end thereof rearwardly of the plow blade, said lever means being adapted to be grasped by the hand of an operator as he walks behind the body portion for guiding the body portion and maintaining the plow blade at least partly below ground level as the body portion is pulled along the ground by the winch cable, and handle receiving means positioned on the body portion forwardly of the mid-point thereof for releasably engaging a handle to be grasped by an operator as support when he is standing on the laterally extending arms of the leveling means as the body portion is pulled along the ground by the winch cable.

References Cited
UNITED STATES PATENTS

| | | | |
|---|---|---|---|
| 29,285 | 7/1860 | Karr | 61—72.6X |
| 970,818 | 9/1910 | Harryman | 37—193 |
| 3,295,333 | 1/1967 | Killoren | 61—72.6 |

FOREIGN PATENTS

| | | | |
|---|---|---|---|
| 402,506 | 12/1933 | Great Britain | 37—193 |
| 832,001 | 4/1960 | Great Britain | 37—193 |

JACOB SHAPIRO, Primary Examiner

U.S. Cl. X.R.

37—193